(12) United States Patent
Nishimoto et al.

(10) Patent No.: US 7,974,086 B2
(45) Date of Patent: Jul. 5, 2011

(54) ATTACHMENT UNIT FOR INFORMATION STORAGE DEVICE, AND ELECTRONIC APPARATUS

(75) Inventors: Masahiko Nishimoto, Kanagawa (JP); Masato Kobayashi, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 88 days.

(21) Appl. No.: 12/254,554

(22) Filed: Oct. 20, 2008

(65) Prior Publication Data

US 2009/0116182 A1  May 7, 2009

(30) Foreign Application Priority Data

Nov. 7, 2007 (JP) .................... P2007-289220

(51) Int. Cl.
*H05K 7/00* (2006.01)
(52) U.S. Cl. ......... 361/679.33; 361/679.34; 361/679.35; 361/679.36; 361/679.37; 361/679.38
(58) Field of Classification Search .. 361/679.31–679.4, 361/679.55, 679.58, 724–727, 683, 679.56, 361/679.33; 312/223.1, 223.2; 211/26; 292/251.5, 292/137, 138, 140, 145, 146, 150
See application file for complete search history.

(56) References Cited

U.S. PATENT DOCUMENTS

| | | | |
|---|---|---|---|
| 2003/0174464 A1* | 9/2003 | Funawatari et al. | 361/685 |
| 2005/0023838 A1* | 2/2005 | Schlack | 292/66 |
| 2005/0057895 A1* | 3/2005 | Chen et al. | 361/685 |
| 2007/0205010 A1* | 9/2007 | Chen et al. | 174/50 |
| 2007/0253671 A1* | 11/2007 | McCormack et al. | 385/135 |

FOREIGN PATENT DOCUMENTS

| | | |
|---|---|---|
| JP | 6-309859 | 11/1994 |
| JP | 11-162156 | 6/1999 |
| JP | 11-232855 | 8/1999 |
| JP | 2001-093271 | 4/2001 |
| JP | 2005-088554 | 4/2004 |

* cited by examiner

*Primary Examiner* — Robert J Hoffberg
*Assistant Examiner* — Jerry Wu
(74) *Attorney, Agent, or Firm* — Morgan, Lewis & Bockius LLP (57) ABSTRACT

An attachment unit for an information storage device includes a casing that houses the information storage device and a fixed base on which the casing is detachably mounted. The casing includes a casing body, a pair of rotation supporting shaft portions, a pair of first engagement portions, and a latch portion. The fixed base includes a substantially L-shaped groove, a pair of second engagement portions, and a latch fitting portion. In a state where the casing is mounted on the fixed base, (i) the first engagement portions are in partial contact with the second engagement portions in the first direction, (ii) the casing body is sandwiched in a second direction intersecting the first direction, and (iii) the rotation supporting shaft portions and the latch portion are in partial contact with the grooves and the latch fitting portion, respectively, in a third direction intersecting the first direction and the second direction.

23 Claims, 8 Drawing Sheets

ATTACHMENT UNIT FOR INFORMATION STORAGE DEVICE, AND ELECTRONIC APPARATUS

CROSS-REFERENCE TO RELATED APPLICATIONS

This application is based on and claims priority under 35 USC 119 from Japanese Patent Application No. 2007-289220 filed Nov. 7, 2007.

BACKGROUND

1. Technical Field

The invention relates to an attachment unit for an information storage device, and an electronic apparatus.

2. Related Art

A hard disk drive has widely been known as one of information storage devices. The hard disk drives are mounted on not only personal computers but also various electronic apparatuses. For example, in an image forming apparatus, such as a digital copier and a digital multifunction machine, in order to meet demands for an apparatus having multi-function, for high-speed processing, and the like, the hard disk drive (hereinafter simply referred to as "hard disk") is mounted.

For example, JP 2001-93271 A describes a hard disk attachment structure capable of simplifying the removal operation of a hard disk. JP Hei. 6-309859 A describes a hard disk attachment structure for inserting and removing a hard disk from the front side of a hard disk containing casing. JP Hei. 11-162156 A describes a hard disk attachment structure capable of attenuating vibration that is applied from an outside to a holding member holding a hard disk.

Further, JP Hei. 11-232855 A describes a hard disk attachment structure that is configured so that an unnecessary external force is presented from being applied to an attachment member to which a hard disk is attached. JP 2005-88554 A describes a hard disk attachment structure capable of preventing writing errors, damaged etc. of a hard disk against an impact caused by insertion and removal of a sheet feed tray.

SUMMARY

According to an aspect of the invention, an attachment unit for an information storage device includes a casing that houses the information storage device, and a fixed base on which the casing is detachably mounted. The casing includes a casing body, a pair of rotation supporting shaft portions, a pair of first engagement portions and a latch portion. The casing body houses the information storage device, the information storage device being fixed to the casing body. The pair of rotation supporting shaft portions are disposed at one end of the casing body in a first direction. The pair of first engagement portions are disposed at the other end of the casing body in the first direction. The latch portion is disposed at the other end of the casing body in the first direction. The fixed base includes a substantially L-shaped groove, a pair of second engagement portions and a latch fitting portion. The pair of rotation supporting shaft portions are fitted into the substantially L-shaped groove. The pair of first engagement portions engage with the pair of second engagement portions. The latch portion is fitted into the latch fitting portion. In a state where the casing is mounted on the fixed base, (i) the first engagement portions are in partial contact with the second engagement portions in the first direction, (ii) the casing body is sandwiched in a second direction intersecting the first direction, and (iii) the rotation supporting shaft portions and the latch portion are in partial contact with the grooves and the latch fitting portion, respectively, in a third direction intersecting the first direction and the second direction.

BRIEF DESCRIPTION OF THE DRAWINGS

Exemplary embodiments of the invention will be described in detail based on the following figures, wherein.

DETAILED DESCRIPTION

Hereinafter, exemplary embodiments of the invention will be described in detail with reference to the accompanying drawings. In addition, the technical scope of the invention is not limited to the exemplary embodiments which will be described below, but also includes forms which are obtained by making various modifications or improvements to the exemplary embodiments so long as they can derive specific advantages provided by constituent elements of the invention or combinations thereof.

Figure 1:
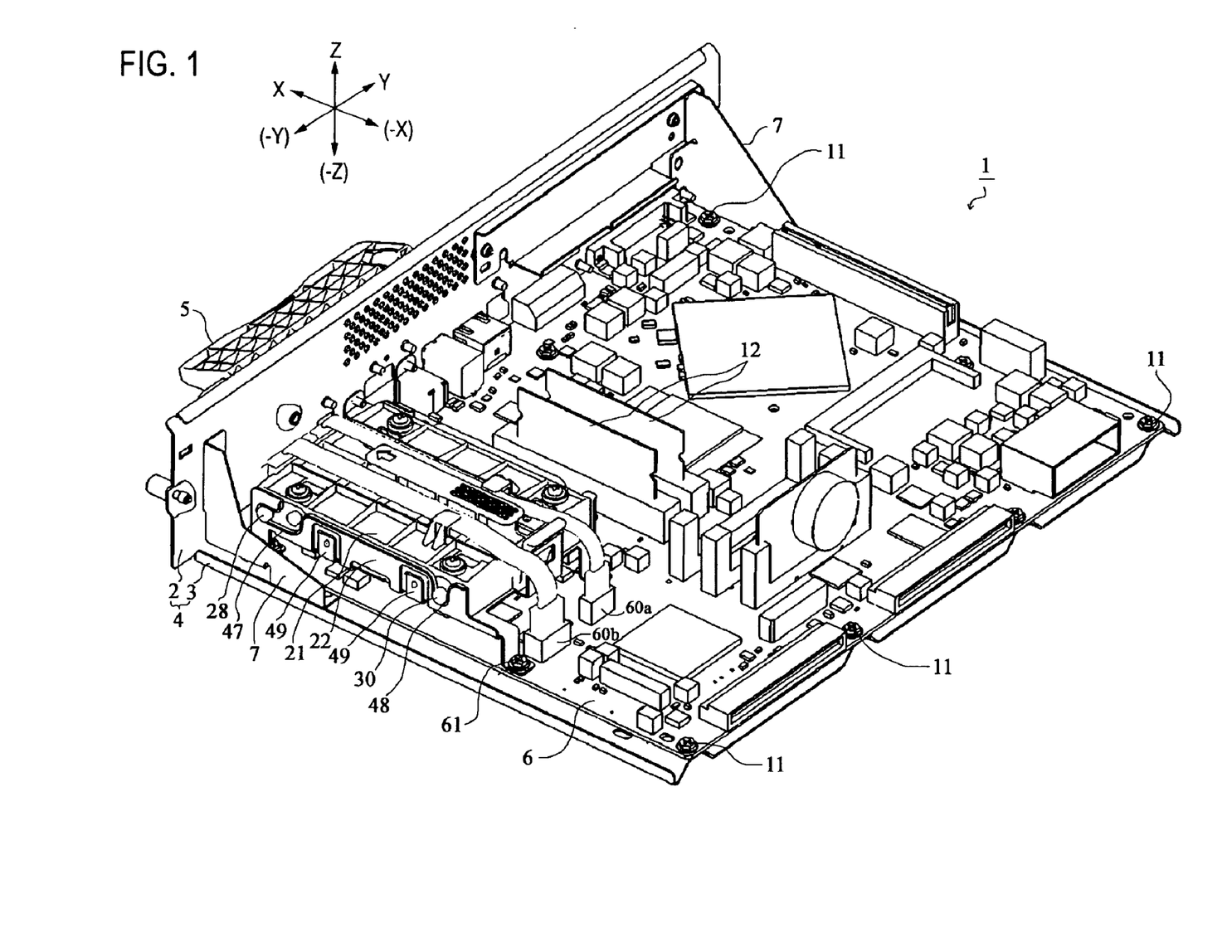
FIG. 1 is a perspective view showing a state where an information storage device is mounted on an electronic apparatus, using an attachment unit for the information storage device according to an exemplary embodiment of the invention.

FIG. 1 is a perspective view showing a state where an information storage device is mounted on an electronic apparatus, using an attachment unit for the information storage device according to an exemplary embodiment of the invention.

A control board module 1 is one which is mounted so as to be detachably inserted into a control box (not shown) assembled into the rear side of a main body (apparatus casing) of, for example, an image forming apparatus such as a digital copier or a digital multi-function machine.

The control board module 1 includes a board supporting member 4, which has a panel portion 2 and a board attachment portion 3 integrally, a handle 5 attached to the front side of the panel portion 2, a control board 6 attached to the board attachment portion 3, and a pair of reinforcing members 7.

In this specification, a direction in which the control board module 1 is removed from and inserted into the control box is defined as an X-axis direction. Also, a direction which is parallel to the board surface of the control board 6 and orthogonal to the X-axis direction is defined as a Y-axis direction. Further, a direction which is perpendicular to the board surface of the control board 6 and orthogonal to the X-axis direction and the Y-axis direction is defined as a Z-axis direction. Orthogonal triaxial directions including the X-axis direction, the Y-axis direction, and the Z-axis direction which are defined here will be used in the following description on the whole control board module 1 in order to specify a structure and a positional relationship between individual portions. Further, the X-axis direction is divided into an X direction and −X direction depending on its orientation. Similarly, the Y-axis direction is divided into a Y direction and −Y direction, and the Z-axis direction is divided into a Z direction and −Z direction.

The board supporting member 4 is formed of a metal plate-like member, which has a substantial L-shape as seen from the Y-axis direction. The control board 6 is attached to the board attachment portion 3 of the board supporting member 4 using plural screws 11 so as to be in a fixed state.

The control board 6 is constructed based on, for example, a rigid board such as a glass epoxy hoard, and is formed in a rectangular shape when viewed from the Z-axis direction. An outer peripheral portion of the control board 6 is fixed to the board attachment portion 3 of the board supporting member 4 using the plural screws 11. A hard disk (not shown) serving as an information storage device is mounted on the control board 6 as well as a memory board 12 and other electronic components.

The hard disk is mounted on the control board 6, using an attachment unit including a casing 21 and a fixed base 22.

Figure 2:
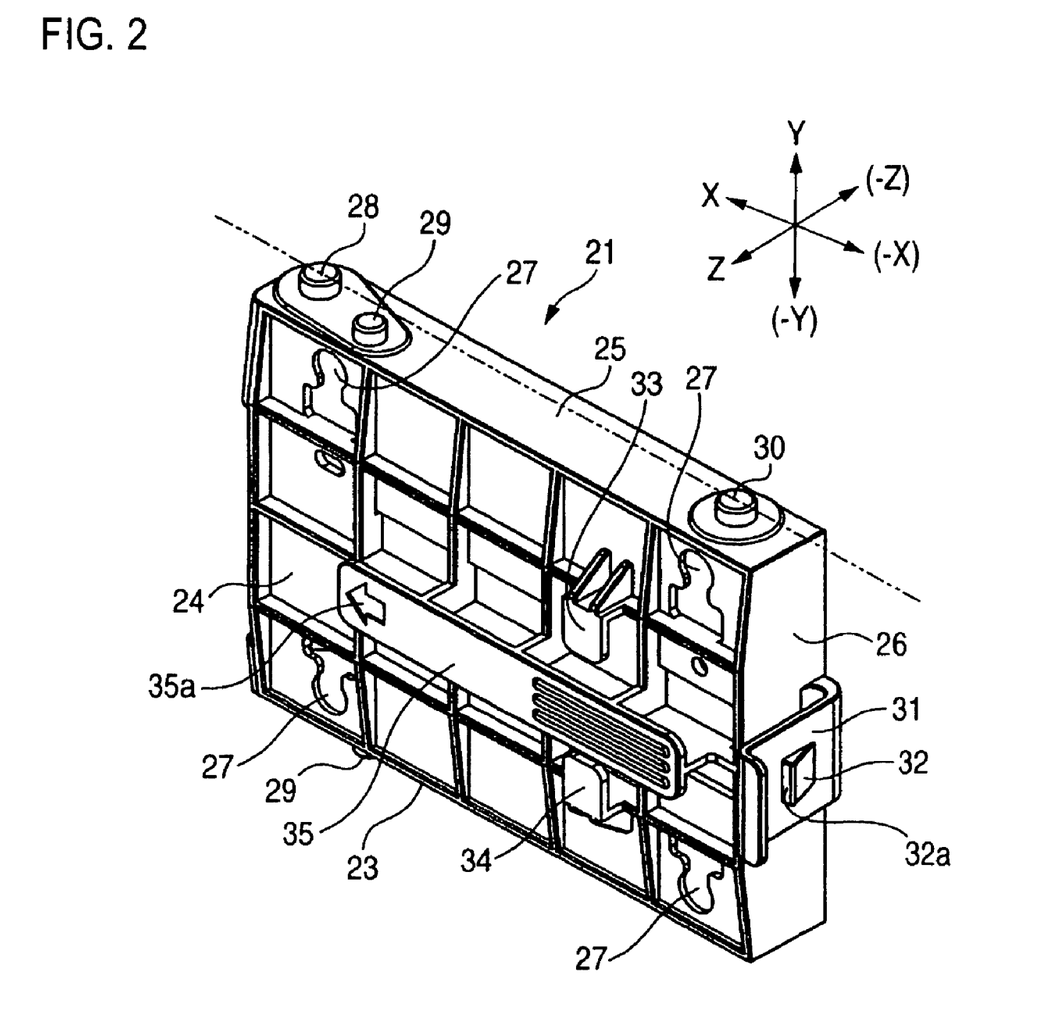
FIG. 2 is a perspective view showing the configuration of a casing.

FIG. 2 is a perspective view showing the configuration of the casing. The casing 21 houses the hard disk, and is formed of an integrally molded product, which is made of resin. The resin for the casing 21 may be engineering resin. Examples of the resin for the casing 21 include ABS resin, silicone resin, styrene based resin, polyimide, nylon, and polyacetal. The casing 21 has a casing body 23 that houses the hard disk is housed with the hard disk being fixed to the casing body. The casing body 23 is formed in a box shape by an rectangle back plate portion 24 reinforced with lattice-shaped ribs, a pair of side plate portions 25 which is provided on the long sides of the back plate portion 24 and which directs the Y-axis direction, and an end plate portion 26 provided on the short side of the back plate portion 24.

The casing body 23 is formed with a housing recess partitioned by the back plate portion 24, the pair of side plate portions 25, and the end plate portion 26. The hard disk having a flat rectangular parallelepiped is housed in this housing recess. The depth of the housing recess is set to be larger than the thickness of the hard disk. Further, although not shown a concave notch portion is provided in a portion of the casing 21, which is opposite to the end plate portion 26 in the X-axis direction (the length direction of the casing 21), and a socket of the hard disk is arranged in this notch portion.

The back plate portion 24 of the casing body 23 is provided with plural attaching holes 27 (four in the illustrated example). Each attaching hole 27 is used to attach the hard disk to the casing body 23. Therefore, the positional relationship among the respective attaching holes 27 is set in accordance with the positional relationship among plural screw holes provided in the surface of the hard disk.

A rotation supporting shaft portion 28 an erroneous mounting preventing portion 29, and a protruding portion 30 are provided in each of the side plate portions 25, which are provided on both sides of the casino body 23. The rotation supporting shaft portion 28 and the erroneous mounting preventing portion 29 are provided on one side (on the side of the X direction) in the X-axis direction. Also, the protruding portion 30 is provided on the other side (on the side of the −X direction) in the X-axis direction as a first engagement portion which engages with a second engagement portion (which will be described later). The rotation supporting shaft portions 28, the erroneous mounting preventing portions 29, and the protruding portions 30 are provided in a state where they protrude outward from the both sides of the casing body 23 in the Y-axis direction. Further, the rotation supporting shaft portions 28, the erroneous mounting preventing portions 29, and the protruding portions 30 are formed in a pin shape (round pin shape) having a circular shape in section. Each of the pair of the rotation supporting shaft portions 28, the pair of the erroneous mounting preventing portions 29, and the pair of the protruding portions 30 is arranged on the same axis parallel to the Y axis.

The erroneous mounting preventing portions 29 are provided in the vicinity of the rotation supporting shaft portions 28, and are formed in the pin shape of a pin having a smaller diameter than that of the rotation supporting shaft portions 28. Further, the protruding portions 30 are provided in a position separated by a predetermined distance from the rotation supporting shaft portions 28 in the p-axis direction, and are formed in the pin shape having the same diameter as that of the rotation supporting shaft portions 28. An imaginary line (two-dot chain line in the figure) passing through the pin center of each rotation supporting shaft portion 28 and the pin center of the corresponding protruding portion 30 as seen front the Y-axis direction becomes a straight line parallel to the X axis. Also, the erroneous mounting preventing portions 29 are arranged in positions deviated in the Z direction from the imaginary lines.

A latch portion 31 is provided at the other end of the casing body 23 in the X-axis direction. The latch portion 31 is formed so as to rise substantially in an S shape along an outer surface of the end plate portion 26 from the end plate portion 26 of the casing body 23. The latch portion 31 has one end as a base end and the other end as a free end, and is provided so as to be elastically deformable in the X-axis direction. The base end of the latch portion 31 is supported by the end plate portion 26 in a fixed state. The latch portion 31 is configured to be elastically deformable in the X-axis direction by the flexibility (spring property) of a casing material itself with the base end thereof serving as a fulcrum.

The latch portion 31 is arranged in an intermediate portion of the end plate portion 26 in the Y-axis direction. Hooking portion 32 formed in a substantially right-angled triangle as seen from the Y-axis direction is integrally formed in the latch portion 31. The hooking portion 32 is formed on the outer surface of the latch portion 31 so as to protrude outward (−X direction) in the X-axis direction. The hooking portion 32 has an end face portion 32a which is perpendicular to the Z axis. The end face portion 32a is used as a portion caught by the fixed base 22 in the Z-axis direction.

The back plate portion 24 of the casing body 23 is provided with two cable holding portions 33 and 34 and a handle portion 35 for operation. The two cable holding portions 33 and 34 are arranged so as to face each other in the Y-axis direction. Each of the cable holding portions 33 and 34 is integrated with the rib portion extending in the X-direction, and is formed in an L shape. The handle portion 35 is arranged in an intermediate portion of the back plate portion 24 and between the two cable holding portions 33 and 34 in the Y-axis direction. A mark 35a which is visually referred to when the casing 21 is attached to the fixed base 22 is formed by an arrow-shaped through hole in the handle portion 35. The mark 35a indicates an attachment direction of the casing 21 by the direction of the arrow.

Figure 3:
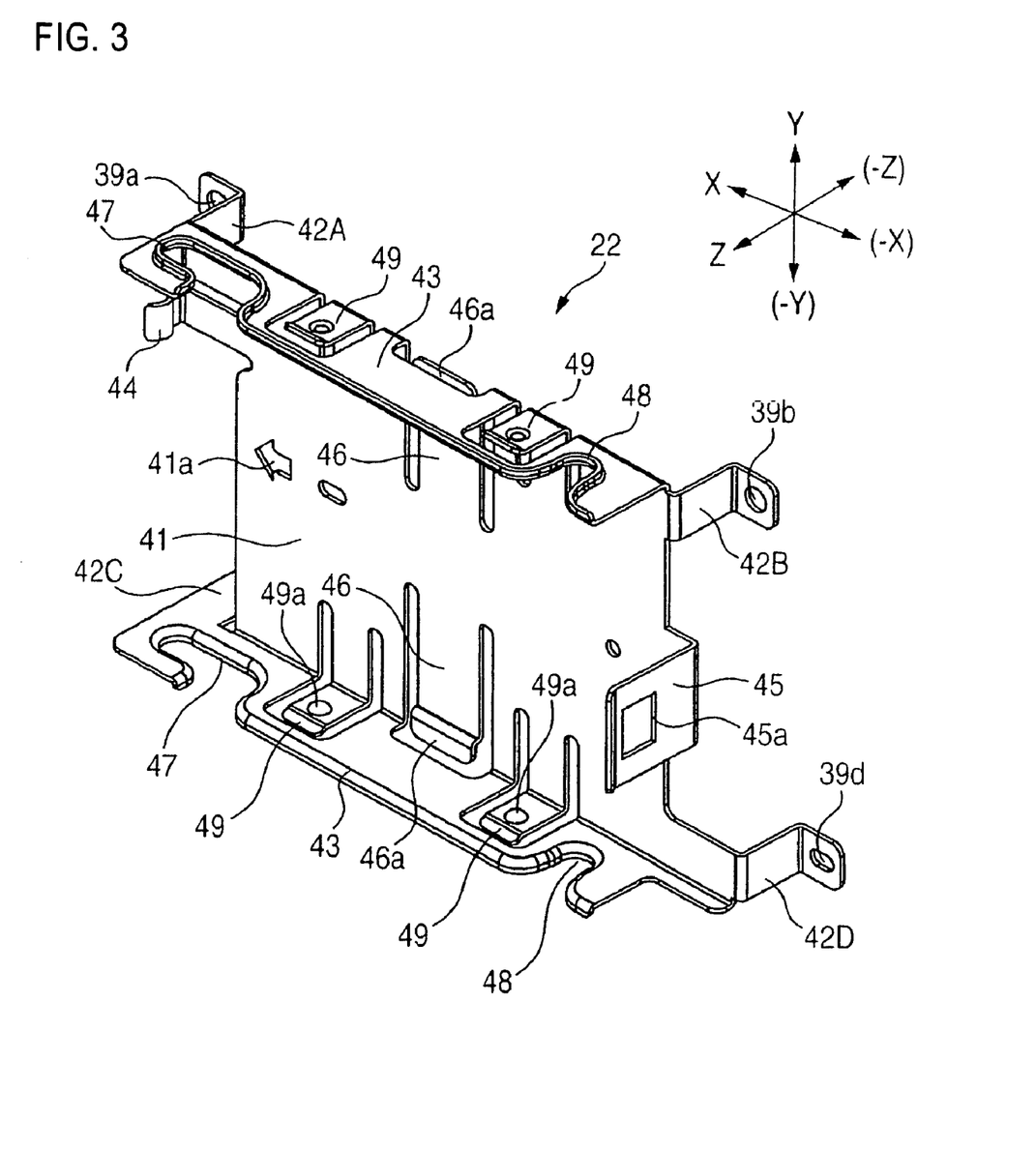
FIG. 3 is a perspective view showing the configuration of a fixed base.

FIG. 3 is a perspective view showing the configuration of the fixed base. The fixed base 22 becomes a pedestal for mounting the hard disk housed in the casing 21 onto the control board 6. The fixed base 22 integrally includes a flat plate-like base portion 41, four supporting legs 42A to 42D, a pair of wing portions 43, a pressing portion 44, and a latch fitting portion 45. The pressing portion 44 is provided in the fixed base 22 as a first pressing portion. The fixed base 22 is formed of a metal material which contains, for example, iron as a main material, and has a surface subjected to plating (for example, oxidation chrome plating) for the purpose of anti-corrosion, etc. However, the fixed base 22 is not limited to one made of the metal material, but may be made of, for example, resin.

The base portion 41 is formed in a substantially rectangular shape as seen from the Z-axis direction. A mark 41a which is visually referred to when the casing 21 is attached to the fixed base 22 is formed in the base portion 41 by an arrow-shaped through hole. The direction of the arrow which the mark 41a indicates corresponds to the direction of the arrow which the mark 35a provided in the above casing 21 indicates. That is, when the casing 21 is to be mounted on the fixed base 22, the casing 21 is attached in a right direction by aligning the directions of the marks (arrows) 35a and 41a provided in both the casing and the fixed base.

Further, the base portion 41 is provided with a pair of push-up portions 46. The pair of push-up portions 46 are provided in the fixed base 22 as a third pressing portion. Each of the push-up portions 46 is provided in an intermediate portion of the fixed base 22 in the X-axis direction. Further, each push-up potion 46 is provided so as to be elastically deformable in the Z-axis direction by cutting out a portion of the base portion 41 to form a narrow groove having a substantial U-shape. An outer end 46a of each push-up portion 46 has a stepped structure so as to protrude in the Z direction from the principal plane of the base portion 41.

The four supporting legs 42A to 42D are provided to fix and support the base portion 41 of the fixed base 22 in a state where the base portion 41 has floated from the control board 6. Each of the supporting legs 42A to 42D is provided so as to protrude in the -Z direction from the base portion 41. Further, each supporting legs 42A-42D is bent in an L shape such that its end becomes parallel to the surface of the control board 6. The supporting legs 49A and 42B are provided at both ends in the X-axis direction on one side (Y direction) in the Y-axis direction. The supporting legs 42C and 42D are provided at both ends in the X-axis direction on the other side (-Y direction) in the Y-axis direction. The end of the supporting leg 42A is provided with a circular hole 39a, and the end of the supporting leg 42B is provided with a circular hole 39b. Further, the end of the supporting leg 42C is provided with a circular hole (not shown), and the end of the supporting leg 42D is provided with a long hole 39d which is long in the X-axis direction.

The pair of wing portions 43 are formed so as to be bent perpendicularly in the Z direction from two mutually corresponding side portions (long side portions) of the base portion 41. The pair of wing portions 43 are arranged so as to face each other in the Y-axis direction. Each wing portion 43 is formed with a groove 47 having a substantial L shape as seen from the Y-axis direction, and a groove 48 having a substantial U shape as seen from the Y-axis direction. The grooves 48 are provided in the fixed base 22 as the second engagement portions which engage with the protruding portions 30 provided as the first engagement portions as described above. In the X-axis direction, the grooves 47 are arranged at one end (X direction) of the wing portions 43, and the grooves 48 are arranged at the other end (-X direction) of the wing portions 43.

The grooves 47 are arranged so as to make a pair on one side and on the other side in the Y-axis direction, and the grooves 48 are arranged so as to make a pair on one side and on the other side in the Y-axis direction. The rotation supporting shaft portions 28 are fitted into the grooves 47, and the protruding portions 30 are fitted into the grooves 48. The groove width of each groove 47 in the Z-axis direction is set to be slightly larger (for example, about 0.1 to 0.2 mm) than the diameter of the corresponding rotation supporting shaft portion 28, and the groove width of each groove 48 in the X-axis direction is set to be slightly larger (for example, about 0.1 to 0.2 mm) than the diameter of the corresponding protruding portion 30. The rotation supporting shaft portions 28 are inserted into the grooves 47 from the Z-axis direction, and are fitted into the grooves 47 in a state of being shifted in the X direction. Therefore, in the X-axis direction, the distance from the position of the groove 47 on the X-direction side to the groove 48 is set to be equal to the distance between the rotation supporting shaft portion 28 and the protruding portion 30.

In the X-axis direction, two pressing portions 49 are provided between the groove 47 and the groove 48. The two pressing portions 49 are separated a predetermined distance in the X-axis direction. Further, in the Y-axis direction, the two pressing portions 49 are arranged so as to face each other at a distance corresponding to the lateral dimension of the casing 21. Accordingly, the four pressing portions 49 in total are provided in the fixed base 22. Each pressing portion 49 is provided in the fixed base 22 as a second pressing portion.

Each pressing portion 49 is formed so as to be bent in an L shape from the base portion 41 to the wing portion 43. Each pressing portion 49 is provided with a hemispherical projection 49a. When the casing 21 is mounted on the fixed base 22, the projections 49a come into contact with the side plate portions 25 of the casing 21. The projection 49a is provided at one end of each of the pressing portions 49 which face each other in the Y-axis direction. One end of the pressing portion 49 provided with the projection 49a is provided so as to be elastically deformable in the Y-axis direction by the flexibility (spring property) of the material of the fixed base 22. As such, when the casing 21 is mounted on the fixed base 22, the pressing portions 49 which make the pairs in the Y-axis direction come into contact with the side plate portions 25 of the casing body 23, to thereby sandwich the casing 21 therebetween in the Y-axis direction.

The pressing portion 44 is formed so as to extend integrally from the end of the base portion 41 in the X direction. The pressing portion 44 is arranged at a Y-direction end of the base portion 41 in the Y-axis direction. The pressing portion 44 is bent substantially in an L shape so as to protrude in the Z direction from the base portion 41. The end of the pressing portion 44 is bent in a circular-arc shape so as to become convex toward the -X direction. Further, the end of the pressing portion 44 is provided so as to be elastically deformable in the X-axis direction by the flexibility (spring property) of the material of the fixed base 22. When the casing 21 is mounted on the fixed base 22, the pressing portion 44 comes into contact with the opposite side of the casing body 23 to the end plate portion 26, to thereby press the casing 21 in the -X direction.

The latch fitting portion 45 is formed so as to extend integrally from the end of the base portion 41 in the -X direction. The latch fitting portion 45 is arranged in an intermediate portion of the base portion 41 in the Y-axis direction. The latch fitting portion 45 is bent substantially in an L shape so as to protrude in the Z direction from the base portion 41. Further, a portion, which protrudes in the Z direction, of the latch fitting portion 45 is provided so as to be elastically deformable in the X-axis direction by the flexibility (spring property) of the material of the fixed base 22. A hole 45a which is rectangle as seen from the X-axis direction is provided in the portion which protrudes in the Z-axis direction, of the latch fitting portion 45. When the casing 21 is mounted on the fixed base 22, the hooking portion 32 of the latch portion 31 provided on the casing 21 is fitted into the hole 45a of the latch fitting portion 45.

Figure 4:
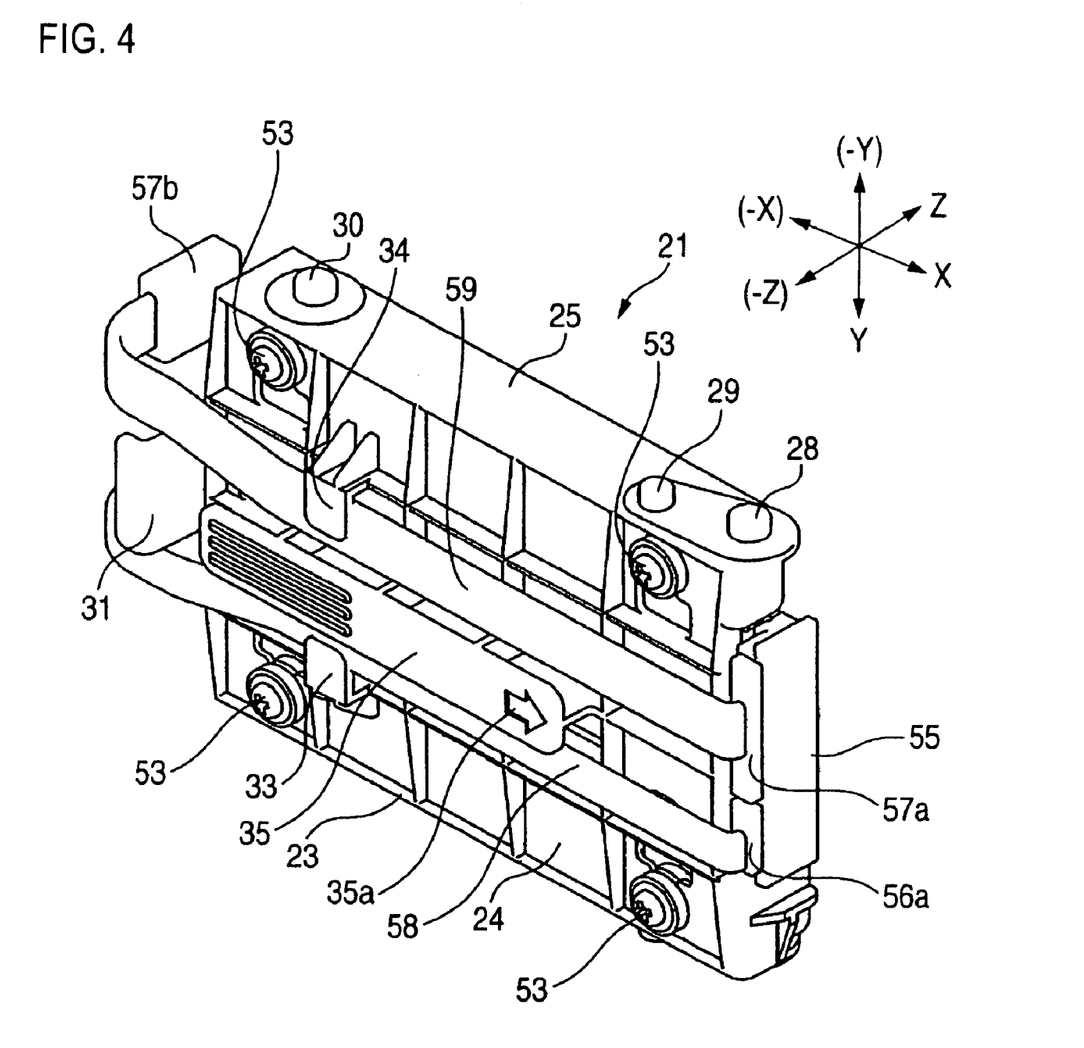
FIG. 4 is a perspective view showing an attachment state the an information storage device.
Figure 5A:
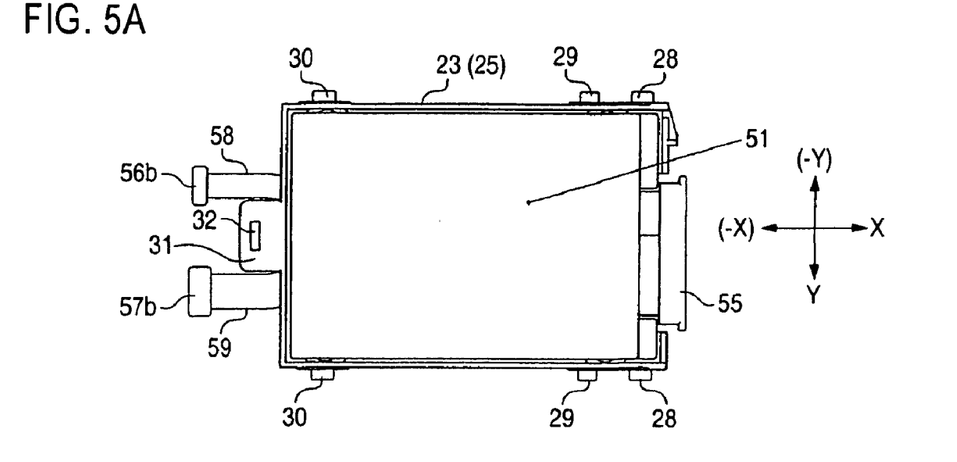
FIGS. 5A to 5C are views showing the attachment state of the information storage device when seen from three directions.
Figure 5B:
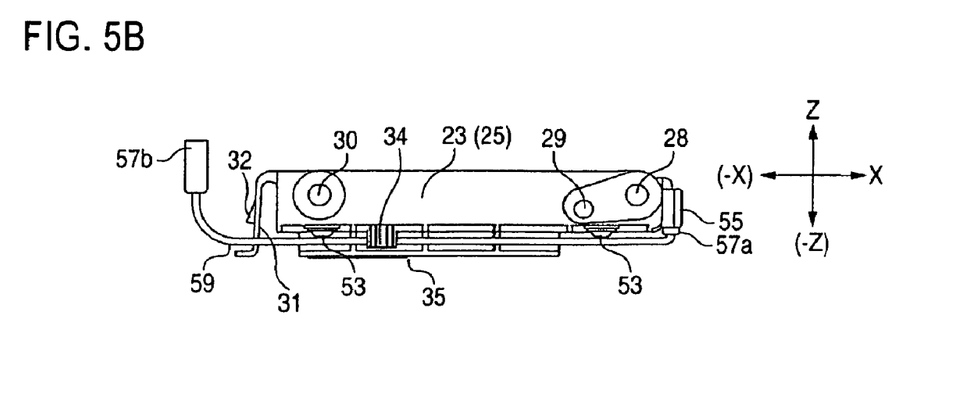
Figure 5C:
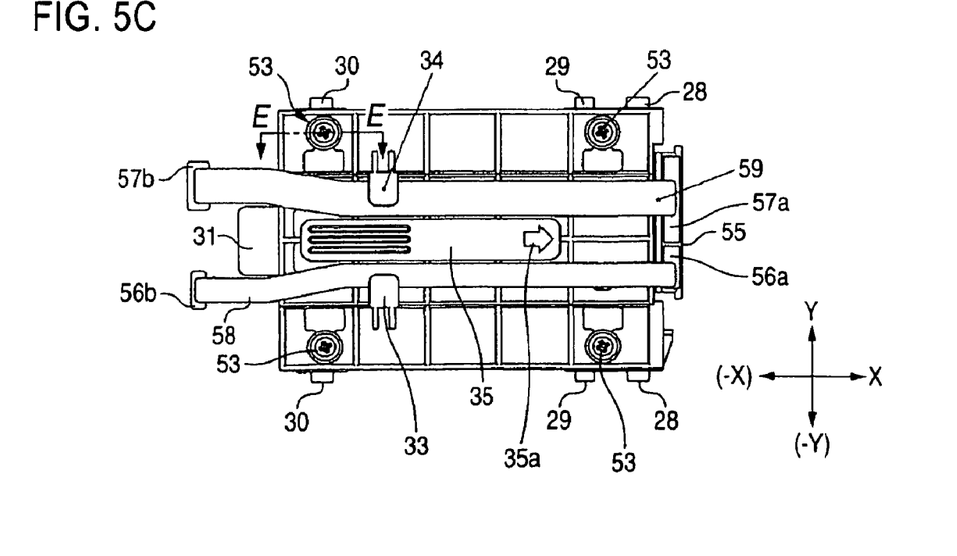
Figure 6:
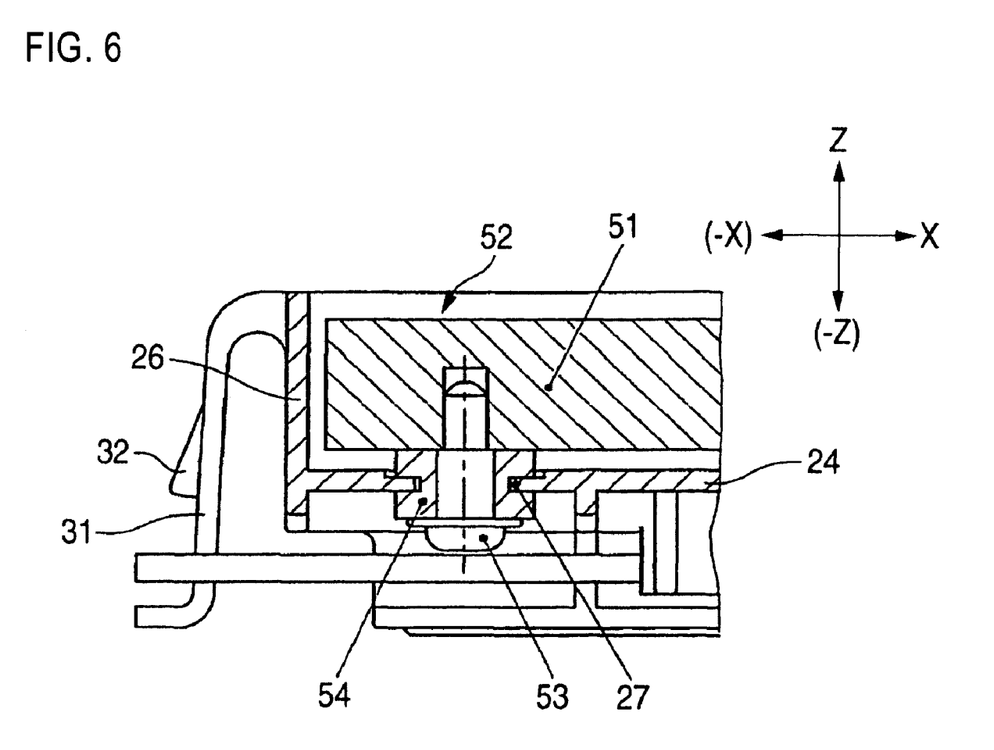
FIG. 6 is a section view taken along a direction of arrows E-E in FIG. 5C.

FIG. 4 is a perspective view showing an attachment state of the information storage device. Further, FIGS. 5A to 5C are views when the attachment state of the information storage device is seen from three directions. FIG. 6 is a section view taken along a direction) of a line F-F in FIG. 5C.

As shown in these figures, a main body of the hard disk 51, which is an example of the information storage device, is formed as a flat rectangular parallelepiped as mentioned above. The hard disk 51 is housed in the housing recess 52 of the casing 21 (see FIG. 6). The hard disk 51 is fixed in the housing recess 52 using four screws 53 in total. Each screw 53 is inserted into a screw hole (female screw portion) of the hard disk 51 through the attaching hole 27 of the casing 21. The attaching hole 27 is mounted with an impact absorbing material 54 made of rubber. The male screw portion of the screw 53 is inserted into the screw hole of the hard disk 51 through a hole formed in the impact absorbing material 54.

A socket 55 is provided at one end of the hard disk 51 in the X-axis direction. Two connectors 56a and 57a are inserted into the socket 55. The connector 56a is provided at one end of a cable 58. The cable 58 is wired substantially parallel to the X-axis direction along the handle portion 35, and is held by the cable holding portion 33 in its intermediate portion. The cable holding portion 33 holds down the cable 58 so as to prevent the cable 58 from floating in the −Z direction. A connector 56b is provided at the other end of the cable 58.

The connector 57a is provided at one end of a cable 59. The cable 59 is wired substantially parallel to the X-axis direction along the handle portion 35, and is held by the cable holding portion 34 in its intermediate portion. The cable holding portion 34 holds down the cable 59 so as to prevent the cable 59 from floating in the −Z direction. A connector 57b is provided at the other end of the cable 59. The connector 56b of the cable 58 is inserted into a socket 60a (see FIG. 1) provided on the control board 6, and the connector 57b of the cable 59 is inserted into a socket 60b provided next to the socket 60a on the control board 6.

Figure 7:
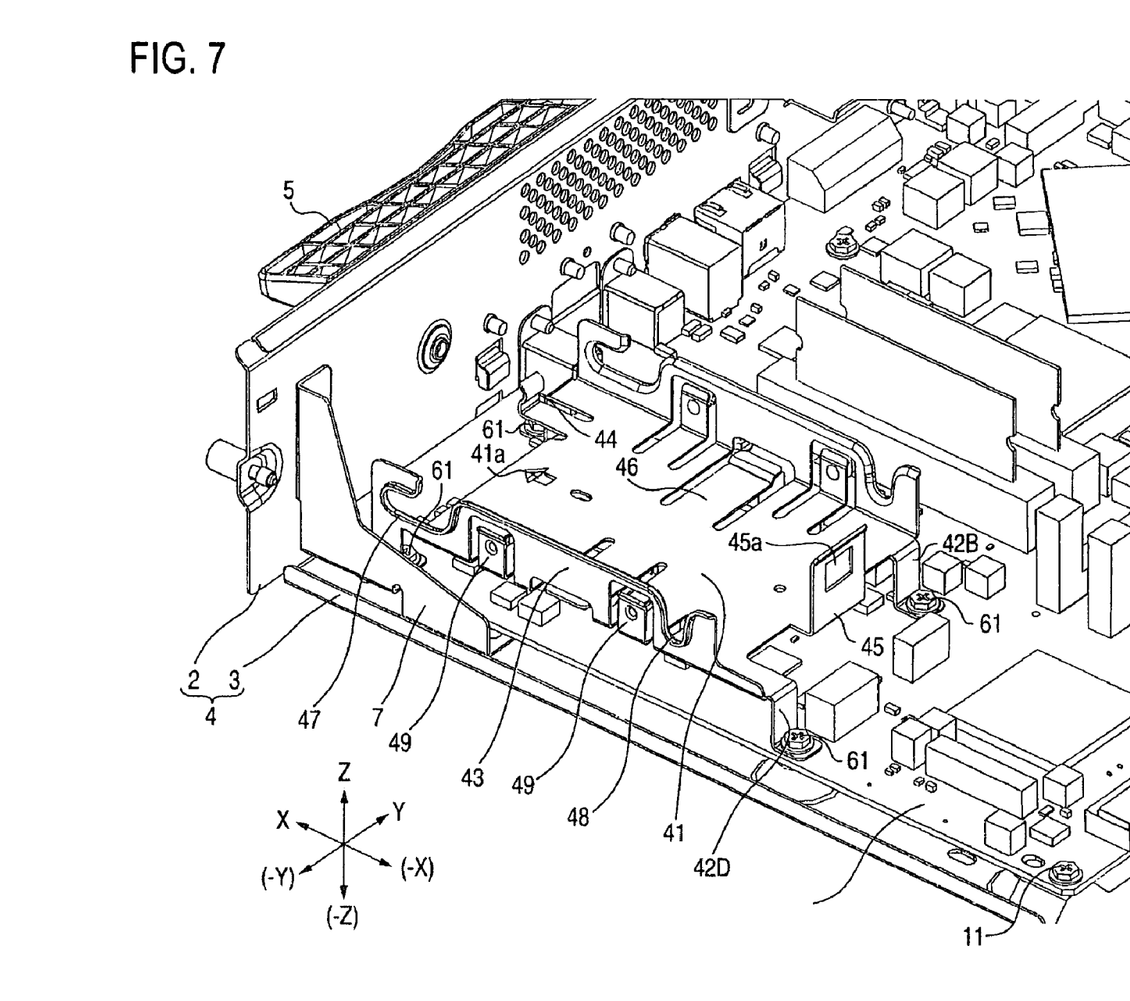
FIG. 7 is a perspective view showing an attachment state of the fixed base.

FIG. 7 is a perspective view showing an attachment state of the fixed base 22. As shown in this figure, the fixed base 22 is attached and fixed to the board attachment portion 3 along with the control board 6, using the flour screws 61 in total. Each screw 61 is inserted into the screw hole (female screw portion) of the board attachment portion 3, through the hole 39 provided in each supporting leg 49 of the fixed base 22 and through the hole (not shown) provided in the control board 6.

When the hard disk 51 is mounted on the control board module 1 using the attachment unit configured as described above, the casing 21 to which the hard disk 51 is attached in advance is mounted on the fixed base 22, which is fixed on the control board 6 as mentioned above, in the following manner.

Figure 8:
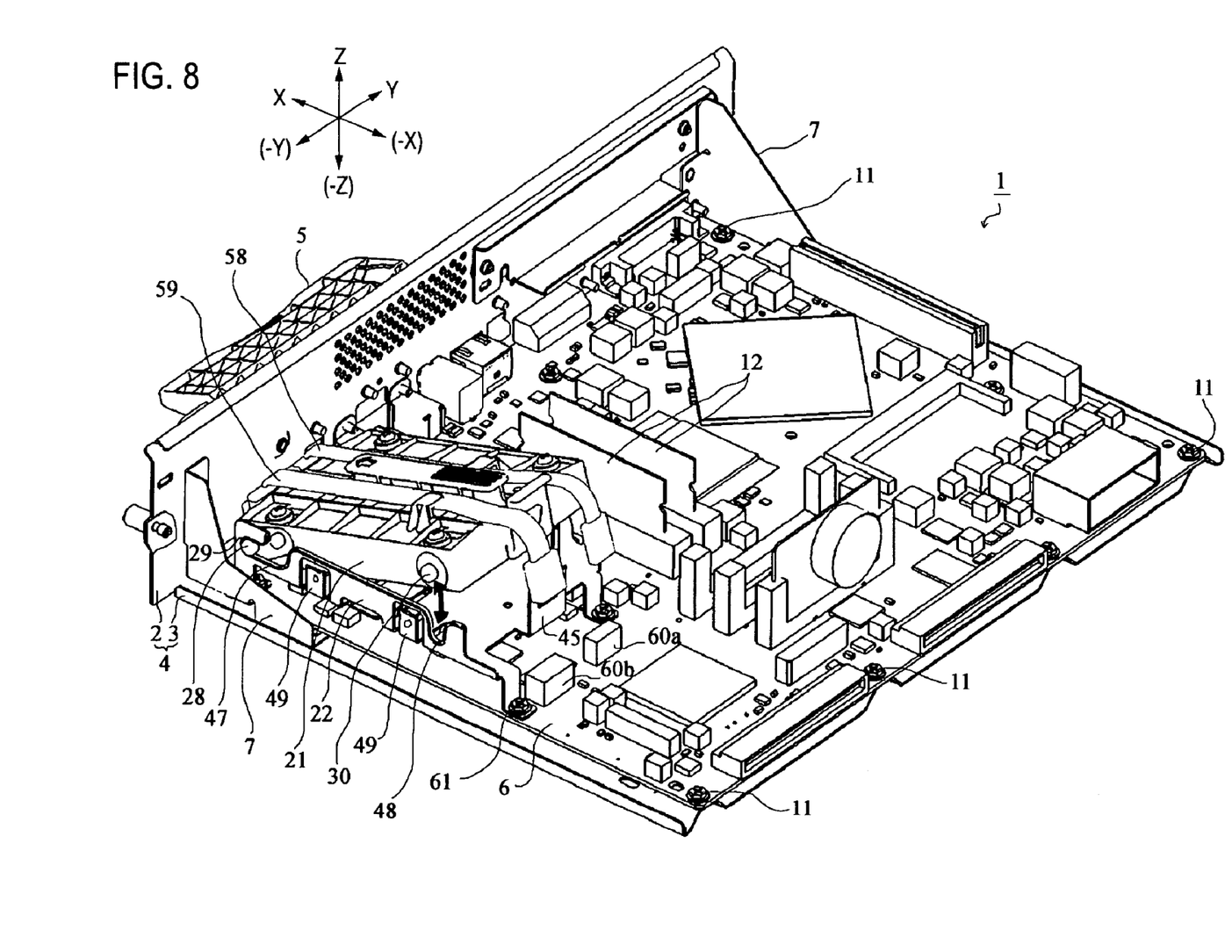
FIG. 8 is a perspective view showing a state in the middle of attachment or detachment of the casing.

First, the rotation supporting shaft portions 28 of the casing 21 are fitted into the grooves 47 of the fixed base 22 with the direction of the mark 41a provided in the base portion 41 of the fixed base 22 being aligned with the direction of the mark 35a provided in the handle portion 35 of the casing 21. In this operation, as shown in FIG. 8, the rotation supporting shaft portions 28 are biased toward the depth side of the grooves 47 by obliquely inclining the whole casing 21 so that the rotation supporting shaft portions 28 are located at a lower side and the protruding portions 30 are located at a higher side, to thereby fit the rotation supporting shaft portion 28s of the casing 21 into the grooves 47 of the fixed base 22 from the Z-axis direction. Thereafter, the casing 21 is pushed in the X direction, to thereby shift the rotation supporting shaft portions 28 to the depth side of the groove portions 47. At this time, the circular-arc portion of the pressing portion 44 provided in the fixed base 22 is in contact with the casing 21 with a predetermined pressure in the X-axis direction, which is generated by the flexibility of the pressing portion 44 itself.

Next, the casing 21 is rotated in a direction in which the protruding portions 30 of the casing 21 approaches the grooves 48 of the fixed base 22 with the pair of rotation supporting shaft portions 28 being used as centers (fulcrums). Then, while the casing 21 is rotated, the protruding portions 30 are fitted into the grooves 48 from the Z-axis direction, and the hooking portion 32 of the latch portion 31 are brought into contact with the latch fitting portion 45 of the fixed base 22. At this time, at least one of the latch portion 31 and the latch fitting portion 45 receives a pressing force generated by the contact therebetween, and is elastically deformed in the X-axis direction. Then, if the whole hooking portion 32 is completely fitted into the hole 45a this elastic deformation is released at that moment. In this state, the end face portion 32A of the hooking portion 32 is hooked to an upper edge of the hole 45a, to thereby prevent the hooking portion 32 from being detached from the hole 45a. At this time, the projections 49a of the pressing portions 49 provided in the fixed base 22 are in contact with the side plate portions 25 of the casing 21 under a predetermined pressure in the Y-axis direction, which is generated by the flexibility of the pressing portion 49 itself. Moreover, the ends 46a of the push-up portions 46 provided in the fixed base 22 is in contact with the side plate portions 25 of the casing 21 under a predetermined pressure in the Z-axis direction, which is generated by the flexibility of the push-up portion 46 itself.

After the casing 21 is mounted on the fixed base 22 in this way, the connectors 56b and 57b of the cables 58 and 59 are inserted into the corresponding sockets 60a and 60b of the control board 6, to thereby electrically connect the control board 6 with the hard disk 51 housed in the casing 21. Thereby, the hard disk 51 is attached to the control board module 1.

If a person tries to mount the casing 21 on the fixed base 22 with the direction of the mark 35a being oppositely oriented to that of the mark 41a, the protruding portions 30 instead of the rotation supporting shaft portions 28 are erroneously fitted into the grooves 47, and the casing 21 is rotated. However, the erroneous mounting preventing portions 29 are hooked to de edges of the wing portions 43 of the fixed base 22. Therefore, it becomes impossible to mount the casing 21. That is, the erroneous mounting preventing portions 29 serves as portions which limit (regulate), to one direction of the X-axis direction, the attachment direction (direction of attachment) of the casing 21 to the fixed base 22. Accordingly, erroneous mounting of the casing 21 can be reliably prevented.

On the other hand, when the casing 21 attached in this way is detached from the fixed base 22, the fitting (hooking state) between the latch fitting portion 45 of the fixed base 22 and the latch portion 31 of the casing 21 is released by pressing and elastically deforming the latch portion 31 of the casing 21 in the X direction after the connectors 56b and 57b of the cables 58 and 59 are pulled out of the sockets 60a and 60b of the control board 6. In this state, the end (on the side of the latch portion 31) of the casing 21 may be rotated so as be raised with the rotation supporting shaft portion 28 as a center (fulcrum). Thereby, since the protruding portions 30 of the casing 21 is disengaged from the grooves 48 of the fixed base 22 as shown in FIG. 8, the rotation supporting shaft portions 28 are disengaged from the grooves 47 by shifting the casing 21 in the −X direction in this state. Thereby, the hard disk 51 is completely detached from the control board module 1.

As such, when the attachment unit according to this exemplary embodiment of the invention is used, the casing 21 in which the hard disk 51 is housed is attached to and detached from the fixed base 22 fixed on the control board 6 by simple operations, such as the pushing operation of the casing 21 and the release operation of the latch. Further, attachment and detachment of the casing 21 are performed by fitting the rotation supporting shaft portions 28 of the casing 21 into the grooves 47 of the fixed base 22 and rotating the casing 21 with the rotation supporting shaft portions 28 as a fulcrum. Accordingly, the hard disk 51 can be easily detached and attached with space saved.

Further, in a state where the casing 21 is mounted on the fixed base 22, the casing 21 in which the hard disk 51 is housed is pressed by the pressing portion 44 in the −X direction. Under this pressing force, the protruding portions 30 of the casing 21 are brought into partial contact with the grooves 48 of the fixed base 22. Therefore, overload is not generated in the X-axis direction in the fitting portion between the latch portion 31 and the latch fitting portion 45.

Further, the casing 21 is pressed in the Y-axis direction by the four pressing portions 49 provided in the fixed base 22. Under this pressing force, the casing 21 is sandwiched in the Y-axis direction by the four pressed pieces 49. Moreover, the casing 21 is pressed in the Z direction by the push-up portions 46. Under this pressing force, the rotation supporting shaft portions 28 are brought into partial contact with the grooves 47, and the hooking portion 32 of the latch portion 31 is in partial contact with the hole 45a of the latch fitting portion 45.

Therefore, the casing 21 in which the hard disk 51 is housed is simultaneously constrained in its attachment positions to the fixed base 22 in the orthogonal triaxial directions including the X-axis direction, in the Y-axis direction, and the Z-axis direction. Further, the attachment positions of the casing 21 in the triaxial directions are held using the flexibility (spring property) of the pressing portion 44, the push-up portions 46, and the pressing portions 49. Therefore, the effect of absorbing impact from the outside, and the effect of preventing rattling of attachment are achieved.

Further, by using the casing 21 made of resin, the impact absorbing effect can be further expected as compared with the case where the casing is made of a metal. Also, the case 21 made of resin also can provide cost reduction, compactness of the attachment unit, and the effect of reducing extraneous vibrations.

In addition, although the image forming apparatus has been mentioned as an example of the electronic apparatus on which the information storage device is mounted, the invention is not limited thereto. For example, the invention can also be similarly applied to electronic apparatuses, such as personal computers, video recording apparatuses, and car navigation apparatuses.

Further, although the hard disk has been mentioned as an example of the information storage device, the invention is not limited thereto. For example, the invention can also be similarly applied to the case where magneto-optical disk devices, storage devices using a nonvolatile memory called SSD (Solid-State Drive), etc. are treated as the information storage device.

What is claimed is:

1. An attachment unit for an information storage device, the attachment unit comprising:
    a casing that houses the information storage device; and
    a fixed base on which the casing is detachably mounted,
        wherein the casing includes a casing body that houses the information storage device, the information storage device being fixed to the casing body,
        a pair of rotation supporting shaft portions that are disposed at one end of the casing body in a first direction,
        a pair of first engagement portions that are disposed at an other end of the casing body in the first direction, and
        a latch portion that is disposed at the other end of the casing body in the first direction, the fixed base includes
        a pair of substantially L-shaped grooves into which the pair of rotation supporting shaft portions are fitted,
        a pair of second engagement portions with which the pair of first engagement portions engage, and
        a latch fitting portion into which the latch portion is fitted, and in a state where the casing is mounted on the fixed base, (i) the first engagement portions are in partial contact with the second engagement portions in the first direction, (ii) the casing body is sandwiched by the fixed base in a second direction intersecting the first direction, and (iii) the pair of the rotation supporting shaft portions and the latch portion are in partial contact with the grooves and the latch fitting portion, respectively, in a third direction intersecting the first direction and the second direction,
    wherein the casing body further includes a cable holding portion holding a cable that extends from the information storage device along a longitudinal axis of the casing body in the first direction, and the cable holding portion holds down the cable so as to prevent the cable from floating in a third direction
    wherein the latch portion which is disposed at the casing body is elastically deformable to the first direction, one end portion of the latch portion being a proximal end portion and the other end portion of the latch portion being a free end portion.

2. The attachment unit according to claim 1, wherein the casing is made of resin.

3. The attachment unit according to claim 2, wherein the resin is one selected from a group consisting of ABS resin, silicone resin, styrene based resin, polyimide, nylon, and polyacetal.

4. The attachment unit according to claim 1, wherein the cable holding portion extends from the casing body and has a L shape in section taken along the second direction.

5. The attachment unit according to claim 1, wherein the casing further includes an erroneous mounting preventing portion that limits, to one direction of the first direction, an attachment direction of the casing to the fixed base.

6. The attachment unit according to claim 5, wherein the erroneous mounting preventing portion protrudes from the casing body toward the second direction.

7. An electronic apparatus comprising: an information storage device; a casing that houses the information storage device; and a fixed base on which the casing is detachably mounted, wherein the casing includes
    a casing body that houses the information storage device, the information storage device being fixed to the casing body,
    a pair of rotation supposing shah portions that are disposed at one end of the casing body in a first direction,
    a pair of first engagement portion that are disposed at an other end of the casing body in the first direction, and
    a latch portion that is disposed at the other end of the casing body in the first direction,
    the fixed base includes
    a pair of substantially L-shaped grooves into which the pair of rotation supporting shaft portions are fitted, a pair of second engagement portions with which the pair of first engagement portions engage, and a latch fitting portion into which the latch portion is fitted, and in a state where the casing is mounted on the fixed base, (i) the first engagement portions are in partial contact with the second engagement portions in the first direction, (ii) the casing body is sandwiched by the fixed based in a second direction intersecting the first direction, and (iii) the pair of the rotation supporting shaft portions and the latch portion are in partial contact with the grooves and the latch fitting portion, respectively, in a third direction intersecting the first direction and the second direction, wherein the casing body further includes a cable holding portion holding a cable that extends from the information storage device along a longitudinal axis of the casing body in the first direction wherein, the latch portion which is disposed at the casing body is elastically deformable to the first direction, one end portion of the latch portion being a proximal end portion and the other end portion of the latch portion being a free end portion.

8. The electronic apparatus according to claim 7, wherein the casing is made of resin.

9. The electronic apparatus according to claim 8, wherein the resin is one selected from a group consisting of ABS resin, silicone resin, styrene based resin, polyimide, nylon, and polyacetal.

10. The electronic apparatus according to claim 7, wherein the cable holding portion extends from the casing body and has a L shape in section taken along the second direction.

11. The electronic apparatus according to claim 7, wherein the casing further includes an erroneous mounting preventing portion that limits, to one direction of the first direction, an attachment direction of the casing to the fixed base.

12. The electronic apparatus according to claim 11, wherein the erroneous mounting preventing portion protrudes from the casing body toward the second direction.

13. An electronic apparatus comprising: an information storage device; a casing that houses the information storage device; and a fixed base on which the casing is detachably mounted, wherein the casing includes a casing body that houses the information storage device, the information storage device being fixed to the casing body, a pair of rotation supporting shaft portions that are disposed at one end of the casing body in a first direction, a pair of first engagement portions that are disposed at an other end of the casing body in the first direction, and a latch portion that is disposed at an other end of the casing body in the first direction, the fixed base includes a pair of substantially L-shaped grooves into which the pair of rotation supporting shaft portions are fitted, a pair of second engagement portions with which the pair of first engagement portions engage, and a latch fitting portion into which the latch portion is fitted, and in a state where the casing is mounted on the fixed base, (i) the first engagement portions are in partial contact with the second engagement portions in the first direction, (ii) the casing body is sandwiched by the fixing base in a second direction intersecting the first direction, and (iii) the pair of the rotation supporting shaft portions and the latch portion are in partial contact with the grooves and the latch fitting portion, respectively, in a third direction intersecting the first direction and the second direction, wherein the casing body further includes a cable holding portion holding a cable that extends from the information storage device along a longitudinal axis of the casing body in the first direction, wherein the casing further includes an erroneous mounting preventing portion that limits, to one direction of the first direction, an attachment direction of the casing to the fixed base, the erroneous mounting preventing portion is arranged in the longitudinal direction with the first engagement portions and the rotation supporting shaft portions when a line is drawn in the first direction from a center of the rotation supporting shaft portion to a center of each of the pair of first engagement portions, the erroneous mounting preventing portion is disposed at a position which is away from the line to the third direction.

14. The attachment unit according to claim 1, wherein the latch portion is disposed in the second direction and at an end plate which is different from a lateral plate with the first engagement portions of the casing body.

15. The attachment unit according to claim 1, wherein the latch fitting portion is a substantial L-shape to extend to the third direction from the fixed base.

16. The attachment unit according to claim 1, wherein the latch fitting portion is disposed in the third direction and at a middle portion of a base portion.

17. The attachment unit according to claim 1, wherein the latch fitting portion is elastically deformable to the first direction.

18. The attachment unit according to claim 7, wherein the latch portion is disposed in the second direction and at an end plate which is different from a lateral plate with the pair of the first engagement portions of the casing body.

19. The attachment unit according to claim 7, wherein the latch fitting portion is a substantial L-shape to extend to the third direction from the fixed base.

20. The attachment unit according to claim 7, wherein the latch fitting portion is disposed in the third direction and at a middle portion of a base portion.

21. The attachment unit according to claim 7, wherein the latch fitting portion is elastically deformable to the first direction.

22. The attachment unit according to claim 13, wherein the erroneous mounting preventing portion is a pine shape of which a diameter is smaller than that of the rotation supporting shaft portion.

23. An attachment unit for an information storage device, the attachment unit comprising:

a casing that houses the information storage device; and a fixed base on which the casing is detachably mounted, wherein the casing includes a casing body that houses the information storage device, the information storage device being fixed to the casing body, a pair of rotation supporting shaft portions that are disposed at one end of the casing body in a first direction, a pair of first engagement portions that are disposed at an other end of the casing body in the first direction, and a latch portion that is disposed at the other end of the casing body in the first direction, the fixed base includes a pair of substantially L-shaped grooves into which the pair of rotation supporting shaft portions are fitted, a pair of second engagement portions with which the pair of first engagement portions engage, and a latch fitting portion into which the latch portion is fitted, and in a state where the casing is mounted on the fixed base, (i) the first engagement portions are in partial contact with the second engagement portions in the first direction, (ii) the casing body is sandwiched by the fixing base in a second direction intersecting the first direction, and (iii) the pair of the rotation supporting shaft portions and the latch portion are in partial contact with the grooves and the latch fitting portion, respectively, in a third direction intersecting the first direction and the second direction, wherein the casing body further includes a cable holding portion holding a cable that extends from the information storage device along a longitudinal axis of the casing body in the first direction, and the cable holding portion holds down the cable so as to prevent the cable from floating in a third direction, wherein the latch fitting portion is a substantial L-shape to extend to the third direction from the fixed base.

* * * * *